United States Patent [19]

Bader

[11] Patent Number: 4,795,340

[45] Date of Patent: Jan. 3, 1989

[54] SINGLE-LEAF VALVE FOR GAS-FIRED BOILERS

[75] Inventor: Jean-Marc Bader, Taluyers, France

[73] Assignee: Societe Nationale Elf Aquitaine, Courbevoie, France

[21] Appl. No.: 141,601

[22] PCT Filed: Apr. 1, 1987

[86] PCT No.: PCT/FR87/00105

§ 371 Date: Dec. 1, 1987

§ 102(e) Date: Dec. 1, 1987

[87] PCT Pub. No.: WO87/05987

PCT Pub. Date: Oct. 8, 1987

[30] Foreign Application Priority Data

Apr. 4, 1986 [FR] France ................... 86 04834

[51] Int. Cl.[4] ............................................. F23C 11/04
[52] U.S. Cl. .................................................... 431/1
[58] Field of Search ................. 60/39.79, 39.8; 431/1

[56] References Cited

U.S. PATENT DOCUMENTS 2,701,950 2/1955 Huber et al. .

3,286,728 11/1966 Stephenson .

FOREIGN PATENT DOCUMENTS 0157372 10/1985 European Pat. Off. .
WO84/02762 7/1984 PCT Int'l Appl. .

Primary Examiner—Carroll B. Dority, Jr.
Attorney, Agent, or Firm—Foley & Lardner, Schwartz, Jeffery, Schwaab, Mack, Blumenthal & Evans

[57] ABSTRACT

Single-leaf valve for a gas-fired boiler. It is of the type that comprises a combustion chamber (1), a seat (10) for a valve leaf (9), and a single valve leaf (9) for the two constituents, this single valve leaf (9) being flexible and deformable, and being pressed flat against the valve leaf seat (10) when the boiler is not operating, the said seat (10) having two or more grooves (13, 14 (sic), 19), the first of these grooves being an anti-stick groove (19) which serves to prevent the said leaf (9) from sticking to the said seat (10), and the second of these grooves (13, 14 (sic)) communicating with means whereby at least one of the constituents of the mixture is supplied. Application, in particular, to gas-fired boilers of the pulsed-combustion type.

14 Claims, 1 Drawing Sheet

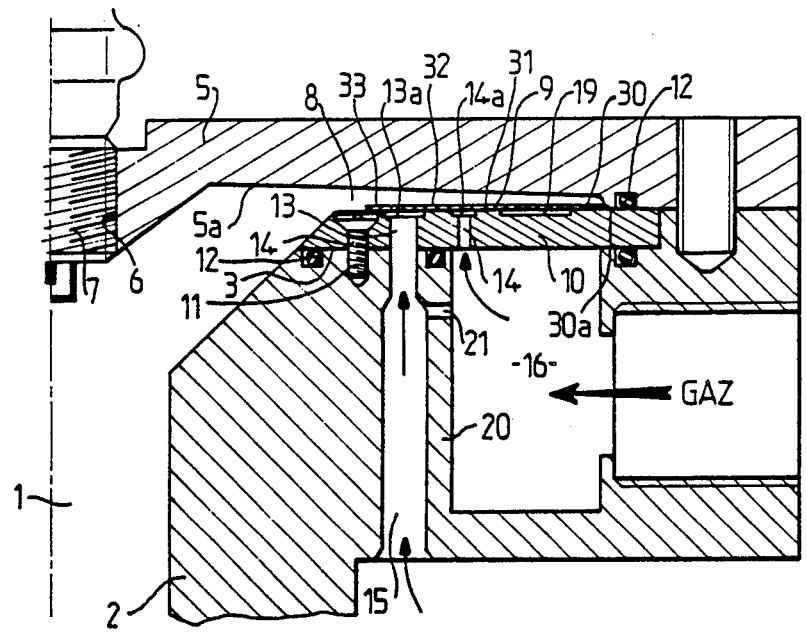
FIG_1
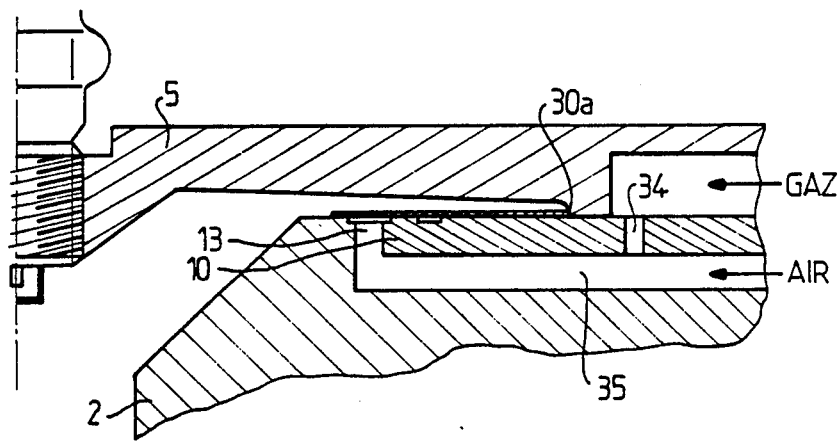
FIG_2

SINGLE-LEAF VALVE FOR GAS-FIRED BOILERS

BACKGROUND OF THE INVENTION

The present invention relates to a single-leaf valve for gas-fired boilers and, more specifically, to a valve for a boiler that comprises a combustion chamber in which pulsewise combustion involving a fuel and an oxidant occurs, the fuel/oxidant mixture being introduced into this chamber in an intermittent manner.

Several devices for supplying a pulsed-combustion chamber with a fuel/oxidant mixture are described in French Patent Application No. 84 04 921 which, dated Apr. 29, 1984, was filed in the name of the Applicant. In each of the devices thus described, the oxidant, in this instance air, is introduced into the combustion chamber through inclined orifices that are provided in an upper plate, whereas the fuel, for example heating oil, is continuously injected by means of a spray nozzle or injection head which is screwed into a bore that is provided in the upper plate.

In one embodiment, a valve leaf is installed between the inside face of the upper plate and a valve leaf seat which is fixed to the throat of the combustion chamber.

In another embodiment, a plurality of valve leaves are installed in a manner such that they possess translational mobility inside centering stops which are fixed to the upper plate. In all cases, the leaf (or leaves) is (or are) pressed flat against the upper plate when, following the initial explosion, the pressure in the combustion chamber becomes higher than the pressure at which the air is injected.

For this reason, when the boiler is not operating, and/or when low pressures prevail in the combustion chamber, the valve leaf (or leaves) is (or are) open, and air is introduced into the pulsed-combustion chamber. Moreover, and because of the very construction of the valve leaves and upper plate, it is difficult to reduce the leaf opening time during operation. In fact, the application of one plane surface to another, namely the pressing of the valve leaves flat against the facing surface of the upper plate, necessitates a higher pressure at the moment when the air is admitted to the pulsed-combustion chamber.

Lastly, it should be noted that it is rather difficult to produce a fuel/oxidant mixture.

SUMMARY OF THE INVENTION

The present invention sets out to remedy the above-mentioned disadvantages, and its object is to propose a leaf valve which utilizes only one leaf, both for admitting each of the constituents of the mixture and for admitting a mixture that has been produced upstream of the pulsed-combustion chamber.

To achieve this object, the valve is of the leaf type, and is for a gas-fired boiler that comprises a chamber in which a mixture of constituents such as air and gas are burned, a body which is fixed to the top of the combustion chamber, and ignition means which are located within the body and are suitable for producing the explosion of the air/gas mixture in the said combustion chamber. Also included are a valve seat and a valve leaf which are located between the body and the combustion chamber, the leaf valve comprising a leaf which is flexible and deformable, and which is pressed flat against the valve leaf seat when the boiler is not operating. The valve leaf seat has two or more grooves, the first of these grooves being an anti-stick groove which serves to prevent the leaf from sticking to the seat, and the second of these grooves communicating with means whereby at least one of the constituents of the mixture is supplied.

Since the single valve leaf is closed when not operating, air cannot be admitted to the combustion chamber for at least as long as the air pressure is insufficient to repel the leaf from its seat.

By virtue of its flexible construction, the valve leaf is caused to execute a translational movement in the vertical direction, through a very short distance, then deforms within the portion facing the means via which the constituents of the mixture are admitted, and returns elastically to the closed position as soon as admission ceases.

Other advantages and characteristics will become evident on reading the description, which follows, of two preferred embodiments of the invention, this description being provided solely by way of information and without implying any limitation, while the same proviso holds good for the drawings which are annexed.

BRIEF DESCRIPTION OF THE DRAWINGS

FIG. 1 is a sectional view of the leaf valve according to the invention, installed in a combustion chamber which has a revolution-generated shape, only a portion of the right-hand half being shown and FIG. 2 is a partial view of the valve leaf, on its seat, as configured in another embodiment according to the invention.

DESCRIPTION OF THE PREFERRED EMBODIMENT OF THE INVENTION

A pulsed-combustion chamber 1 of a boiler, for example a gas-fired boiler, comprises a throat 2 which can have any appropriate shape, such as the one shown in FIG. 1, or also the one shown in the Patent Application mentioned earlier, the said throat 2 comprising a horizontal surface 3. The combustion chamber 1 is cooled by a water-filled enclosure that is not shown in the drawings. A body 5 is fixed to the throat 2, by any fixing means, and comprises a bore 6 for the passage of a spark plug 7 or any other equivalent means of obtaining the explosion of a fuel/oxidant mixture which is introduced into the pulsed-combustion chamber 1. It would also be possible to utilize a horizontally-arranged spark plug.

A valve leaf 9 that is both flexible and elastic is installed, with a valve leaf seat 10, in the gap 8 that is provided between the inside face 5a of the body 5 and the horizontal surface 3. The leaf seat 10 being fixed on top of the throat 2 by fastening screws 11, achieving leak-tightness by means of gaskets 12 that are provided for this purpose in the body 5 and in the throat 2 of the chamber 1.

The valve leaf 9 comes in the form of a very lightweight ring, manufactured in a material that is sufficiently elastic to enable local deformation to be obtained. The seat 10 comprises a certain number of air-admisssion orifices 13 which emerge into an annular groove 13a and are distributed circumferentially around the axis of revolution of the seat. Other orifices 14, for admitting the gas, are also provided in the seat 10, and emerge into an annular groove 14a. The number and distribution of the orifices 13 and 14 are chosen according to the volume of mixture desired in the combustion chamber 1. The annular grooves 13a and 14a are preferably located close to each other, so that the air/gas mixture is produced in the combustion chamber as quickly as possible. An annular groove 19 is also provided in the seat 10, and presents dimensions that are larger than those of the grooves 13a and 14a. The groove 19 is located at some distance from the portion of the combustion chamber where the mixture is produced, so as to avoid disturbing the mixture, while allowing upward displacement of the valve leaf 9 as soon as a low pressure acts on its admission-side face, provided that the low pressure is higher than the pressure prevailing within the gap 8 of the combustion chamber 1.

The orifices 13 and 14 respectively communicate with passages 15 and 16 which are provided in the throat 2. The passage 15 is connected to a source of air, while the passage 16 is connected to a source of gas, this latter passage actually being an enclosure that has a certain volume.

The enclosure 16 is separated from the passage 15 by a partition wall 20.

The inside face 5a of the body 5 is slightly inclined from the center to the periphery, in a manner such that the gap 8 becomes smaller towards the boundary that appears on the right in FIG. 2. For this reason, the valve leaf 9 has a small clearance in this narrowed zone, and its displacement travel is consequently reduced.

During operation, as a result of the admission of one or both of the constituents of the mixture—oxidant or fuel—into the passages, 15 or 16, and into the corresponding orifices, 13 or 14, the valve leaf 9 is lifted more or less vertically until its outside edge 30a comes to bear against the inside surface 5a of the body 5. By virtue of its elasticity, the valve leaf 9 can, if necessary, deform when the pressure of the constituent that is being introduced exceeds the pressure prevailing in the space 8. When the pressure in the combustion chamber 1 rises, following combustion of the mixture, the valve leaf 9 closes very rapidly, on account of the fact that it needs to move through only a small travel distance, and because of the acceleration that is produced by the effect of its elasticity, playing the part of a spring. The same effect occurs in the rest condition, i.e. the valve leaf 9 remains flat against the seat 10 when no pressure acts on one of its faces.

In the example shown in the drawings, the fuel/oxidant mixture is produced in a portion of the combustion chamber 1. It would be equally possible to effect the mixing of the constituents before their admission to the combustion chamber, for example by providing an orifice 21 in the partition wall 20, so as to introduce the gas into the passage 15. The air/gas mixture is then produced in the passage 15, and it is introduced into the combustion chamber 1 through the orifice 13.

Concentric supporting surfaces, 30 to 33, are provided between the grooves 13a, 14a and 19. The supporting surfaces 31 and 32 are very important because it is between them and the valve leaf that leak-tightness is achieved at the moments when the explosions occur. In order to minimize the leakages, these supporting surfaces are produced in a manner such that they are in the same horizontal plane, are free of scratches or porosity, and are not liable to deform at the moment when the cover is clamped onto the valve body. With regards to the outermost supporting surface, 30, it must exhibit the same characteristics as the other supporting surfaces, but can be located in a horizontal plane that is slightly lower, so as to facilitate the application of the valve leaf to the surface of the seat. It is clear that in no case should the supporting surface 30 be higher than the two others, 31 to 33.

In the embodiment shown in FIG. 2, the gas inlet is provided within the upper body 5, through a passage 34 which emerges into an air supply duct 35 that is provided within the seat 10, or within any other appropriate element, in a manner such that the air/gas mixture is produced in the said duct 35 before being introduced into the combustion chamber 1 through the orifice 13.

In the preceding description, reference has been made to a valve leaf which is homogeneous, and which presents physical characteristics that are appropriate as regards lightness and flexibility, so as to obtain the desired deformations. However, it would also be possible to utilize a valve leaf that has differential rigidity, preferably one in which the rigidity would increase from the center to the periphery, rigidity of this nature being obtainable either through the cross-sectional shape of the leaf, or through the internal nature of the composite material employed for its manufacture. The thickness of the valve leaf, at the periphery, could be approximately of the same order of magnitude as the depth of the space that is provided between the cover 5 and the valve leaf seat 10, beside the supporting surface 30. Under these conditions, when a light force acts on the valve leaf at the time that a constituent is admitted to the groove 13a, the facing portion of the leaf, which is very flexible, lifts slightly in order to allow the constituent to enter the gap 8. Complete opening of the valve leaf would occur after its full deformation and the unblocking of an adequate flow cross-section. As regards closing, this would be brought about by the return effect due to the elasticity introduced into the valve leaf as a result of the existing differential rigidity.

The invention must be regarded as being in no way limited to the embodiments which have been described, and which are shown in the drawings, and is capable of numerous variations to suit the applications envisaged, these variations being open to the expert without necessitating any departure from its scope.

What is claimed is:

1. A leaf valve for a gas-fired boiler that comprises a combustion chamber having a throat and in which a mixture of constituents such as air and gas are burned, a body which is fixed to the top of said combustion chamber, ignition means and suitable for producing the explosion of the air/gas mixture in said combustion chamber, a valve leaf seat and a valve leaf which are located between said body and said combustion chamber, wherein the single valve leaf for the two constituents is flexible and deformable, and is pressed flat against the valve leaf seat when the boiler is not operating, and wherein the valve leaf seat has plurality of grooves a first of said grooves being an anti-stick groove which serves to prevent said leaf from sticking to said seat, and a second of said grooves communicating with means whereby at least one of the constituents of said mixture is supplied.

2. The leaf valve as claimed in claim 1, wherein the seat has a third groove communicating with means whereby the other constituent of said mixture is supplied.

3. The leaf valve as claimed in claim 1, wherein the anti-stick groove is located at some distance from a portion of the chamber in which the mixture explodes.

4. The leaf valve as claimed in claim 1, wherein the air/gas mixture is produced before admission to the combustion chamber.

5. The leaf valve as claimed in claim 1, wherein concentric supporting surfaces are provided on the valve leaf seat and between the grooves.

6. The leaf valve as claimed in claim 5, at least three of the supporting surfaces are located in a first horizontal plane.

7. The leaf valve as claimed in claim 5, wherein an outermost supporting surface furthest from the throat is located in a second horizontal plane that is slightly lower than said first horizontal plane.

8. A leaf valve for a gas-fired boiler that comprises a combustion chamber in which a mixture of constituents such as air and gas is burned, a body which is fixed to the top of the combustion chamber, ignition means suitable for producing the explosion of the air/gas mixture in said combustion chamber, a valve leaf seat which has at least one anti-stick groove and a valve leaf which is located within the chamber, between said body and said valve leaf seat, the single valve leaf for the two constituents being flexible and deformable, and being pressed flat against the valve leaf seat when the boiler is not operating, wherein the valve leaf seat has, in addition to the first, anti-stick groove, a second groove, into which emerge means wherein at least one of the constituents of the mixture is supplied.

9. The leaf valve as claimed in claim 8, wherein the seat has a third groove into which emerge means wherein the other constituent of the mixture is supplied.

10. The leaf valve as claimed in claim 8, wherein the said anti-stick groove is located at some distance from a portion of the chamber in which the mixture explodes.

11. The leaf valve as claimed in claim 8, wherein concentric supporting surfaces are provided on the valve leaf seat and between the grooves.

12. The leaf valve as claimed in claim 11, wherein at least three of the supporting surfaces are located in a first horizontal plane.

13. The leaf valve as claimed in claim 12, wherein an outermost supporting surface furthest from the throat is located in a second horizontal plane that is slightly lower than said first horizontal plane.

14. The leaf valve as claimed in claim 8, wherein said valve body forms a stop for said valve leaf, limiting an opening movement.

* * * * *

UNITED STATES PATENT AND TRADEMARK OFFICE
CERTIFICATE OF CORRECTION

PATENT NO. : 4,795,340

DATED : January 3, 1989

INVENTOR(S) : Jean-Marc Bader

It is certified that error appears in the above-identified patent and that said Letters Patent is hereby corrected as shown below:

On the title page, item [73], change "Societe Nationale Elf Aquitaine, Courbevoie, France" to --Societe Nationale Elf Aquitaine, Courbevoie, France and Mareck B.V., Amsterdam, Netherlands--

Signed and Sealed this

Twenty-sixth Day of December, 1989

Attest:

JEFFREY M. SAMUELS

Attesting Officer     Acting Commissioner of Patents and Trademarks